United States Patent
Lv

(10) Patent No.: US 9,900,167 B2
(45) Date of Patent: Feb. 20, 2018

(54) DOCUMENT SHARING METHOD, SYSTEM, AND DEVICE

(71) Applicant: HUAWEI TECHNOLOGIES CO., LTD., Shenzhen, Guangdong (CN)

(72) Inventor: Wen Lv, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 555 days.

(21) Appl. No.: 14/543,275

(22) Filed: Nov. 17, 2014

(65) Prior Publication Data

US 2015/0074199 A1    Mar. 12, 2015

Related U.S. Application Data

(63) Continuation of application No. PCT/CN2013/075636, filed on May 15, 2013.

(30) Foreign Application Priority Data

May 15, 2012 (CN) .......................... 2012 1 0149976

(51) Int. Cl.
*H04L 12/18* (2006.01)
*H04M 7/00* (2006.01)
(Continued)

(52) U.S. Cl.
CPC ...... *H04L 12/1813* (2013.01); *H04L 12/1827* (2013.01); *H04M 7/0024* (2013.01); *H04L 51/08* (2013.01); *H04M 3/56* (2013.01)

(58) Field of Classification Search
USPC .................. 709/204, 203, 219, 227
See application file for complete search history.

(56) References Cited

U.S. PATENT DOCUMENTS 7,096,200 B2 *   8/2006  Wang ................ G06Q 20/10
                                                  380/223
7,165,069 B1 *   1/2007  Kahle ............... G06F 17/30864
(Continued)

FOREIGN PATENT DOCUMENTS

CN       1595366          3/2005
CN       101102211        1/2008
(Continued)

OTHER PUBLICATIONS

Chinese Office Action dated Jul. 22, 2013 in corresponding Chinese Patent Application No. 201210149976.6.
(Continued)

*Primary Examiner* — Jude Jean Gilles
(74) *Attorney, Agent, or Firm* — Staas & Halsey LLP

(57) ABSTRACT

Embodiments of the present invention disclose a document sharing method, system, and device. In the embodiments of the present invention, a document is partitioned by the compere client into at least one page for caching. The method includes: receiving a page notification message, where the page notification message includes an identifier value of the page, and the identifier value is digest information of the page obtained by the compere client by using a digest algorithm; judging, according to the identifier value, whether the page corresponding to the identifier value is already saved; and downloading the page corresponding to the identifier value when the page corresponding to the identifier value is not saved, or not downloading the page when the page corresponding to the identifier value is already saved, which can effectively save bandwidth.

18 Claims, 4 Drawing Sheets

(51) Int. Cl.
*H04M 3/56* (2006.01)
*H04L 12/58* (2006.01)

(56) References Cited

U.S. PATENT DOCUMENTS

| | | | | |
|---|---|---|---|---|
| 7,685,117 | B2* | 3/2010 | Gross | G06F 17/30867 707/999.005 |
| 8,312,222 | B1* | 11/2012 | Martin | G06F 17/30902 711/133 |
| 8,380,932 | B1* | 2/2013 | Martin | G06F 17/30902 711/133 |
| 8,396,881 | B2* | 3/2013 | Kim | G06F 17/30905 707/758 |
| 2005/0102314 | A1* | 5/2005 | Howard | G06F 17/30595 |
| 2006/0002315 | A1 | 1/2006 | Theurer et al. | |
| 2006/0041752 | A1 | 2/2006 | Tuvell et al. | |
| 2008/0005233 | A1 | 1/2008 | Cai et al. | |
| 2008/0201320 | A1* | 8/2008 | Hong | G06F 17/30864 |
| 2008/0201651 | A1* | 8/2008 | Hong | G06F 17/30864 715/764 |
| 2009/0063507 | A1 | 3/2009 | Thompson | |
| 2010/0138396 | A1 | 6/2010 | Kikkawa | |
| 2011/0157298 | A1 | 6/2011 | Huang et al. | |
| 2014/0215328 | A1* | 7/2014 | Qiu | G06F 17/2229 715/273 |

FOREIGN PATENT DOCUMENTS

| | | |
|---|---|---|
| CN | 101480020 | 7/2009 |
| CN | 101789870 | 7/2010 |
| CN | 101820416 | 9/2010 |
| CN | 102004779 | 4/2011 |
| CN | 102708192 | 10/2012 |

OTHER PUBLICATIONS

PCT International Search Report dated Aug. 22, 2013 in corresponding International Patent Application No. PCT/CN2013/075636.
Extended European Search Report dated Mar. 24, 2015 in corresponding European Patent Application No. 13791214.3.
International Search Report dated Aug. 22, 2013, in corresponding International Patent Application No. PCT/CN2013/075636.

* cited by examiner

DOCUMENT SHARING METHOD, SYSTEM, AND DEVICE

CROSS-REFERENCE TO RELATED APPLICATIONS

This application is a continuation of International Application No. PCT/CN2013/075636, filed on May 15, 2013, which claims priority to Chinese Patent Application No. 201210149976.6, filed on May 15, 2012, both of which are hereby incorporated by reference in their entireties.

TECHNICAL FIELD

Embodiments of the present invention relate to a resource sharing technology in the communications field, and in particular, to a document sharing method, system, and device.

BACKGROUND

As exchange among people becomes increasingly frequent in today's world, a conference has already become an important part of people's daily lives. A conferencing system is always used in a business negotiation, product demonstration, guest meeting, and the like. With the popularity and development of a network, a Web conference has become an increasingly important means of communication due to its low cost, convenience of operation, and powerful data capability. Document sharing is a basic function of the Web conference, by which a compere and participants can implement an exchange more efficiently.

A document sharing function in the Web conference means that a compere client can synchronously share a local document with other participant clients, and document operations performed on the participant clients can also be synchronized with document operations performed on the compere client. The compere client refers to a client with a document uploading right. An operator can operate the compere client to upload a shared document to a server, so that other participant clients can download the shared document from the server, thereby implementing document synchronization between the compere client and the participant clients.

However, in the prior art, each time when a conference begins, a compere client needs to upload a whole shared document to a server, and participant clients also need to download the shared document from the server after the conference begins. Therefore, uploading and downloading of the shared document occupy a large amount of bandwidth.

SUMMARY

Embodiments of the present invention provide a document sharing method, system, and device, which are configured to implement document sharing and can effectively save bandwidth.

In a document sharing method provided in an embodiment of the present invention, the document is partitioned by a compere client into at least one page, and the document sharing method includes: receiving a page notification message, where the page notification message includes an identifier value of a page, and the identifier value is digest information of the page obtained by the compere client by using a digest algorithm; judging, according to the identifier value, whether the page corresponding to the identifier value is already saved; and downloading the page corresponding to the identifier value if the page corresponding to the identifier value is not saved.

A document sharing method provided in an embodiment of the present invention includes: partitioning, by a compere client, a document into at least one page; determining an identifier value of the page by using a digest algorithm; and sending a page notification message, which carries the identifier value of the page, to a server, so that the server determines, according to the identifier value, whether the page corresponding to the identifier value needs to be downloaded from the compere client, and the server sends the page notification message to a participant client.

A device provided in an embodiment of the present invention includes: a receiving unit, configured to receive a page notification message, where the page notification message includes an identifier value of a page, and the page is any one page of at least one page obtained by a compere client by partitioning a document, and the identifier value is digest information of the page obtained by the compere client by using a digest algorithm; a judging unit, configured to judge, after the receiving unit receives the page notification message that includes the identifier value, whether the page corresponding to the identifier value is already saved; and a downloading unit, configured to download, after the judging unit determines that the page corresponding to the identifier value is not saved, the page corresponding to the identifier value.

A compere client provided in an embodiment of the present invention includes: a partitioning unit, configured to partition a document into at least one page; a determining unit, configured to determine, after the partitioning unit partitions the document into at least one page, an identifier value of the page by using a digest algorithm; and a sending unit, configured to carry, after the determining unit determines the identifier value of the page, the identifier value of the page in a page notification message and send the page notification message to a server, so that the server determines, according to the identifier value, whether the page corresponding to the identifier value needs to be downloaded from the compere client, and the server sends the page notification message to a participant client.

A document sharing system provided in an embodiment of the present invention includes a compere client, a server, and a participant client.

It can be seen from the foregoing technical solution that the embodiments of the present invention have the following advantages:

A shared document is partitioned by a compere client into at least one page for caching; a server and a participant client receive a page notification message that includes an identifier value of the page, where the identifier value is message digest of the page obtained by the compere client by using a digest algorithm, so that the server and the participant client can judge, according to the identifier value, whether the page corresponding to the identifier value is already saved; if the page corresponding to the identifier value is not saved, the page corresponding to the identifier value is downloaded. In this way, the number of pages obtained by the server from the compere client can be effectively reduced, and the number of pages obtained by the participant client from the server is reduced, thereby saving bandwidth.

DESCRIPTION OF EMBODIMENTS

Embodiments of the present invention provide a document sharing method, system, and device, which are configured to implement document sharing and can effectively save bandwidth.

Figure 1:
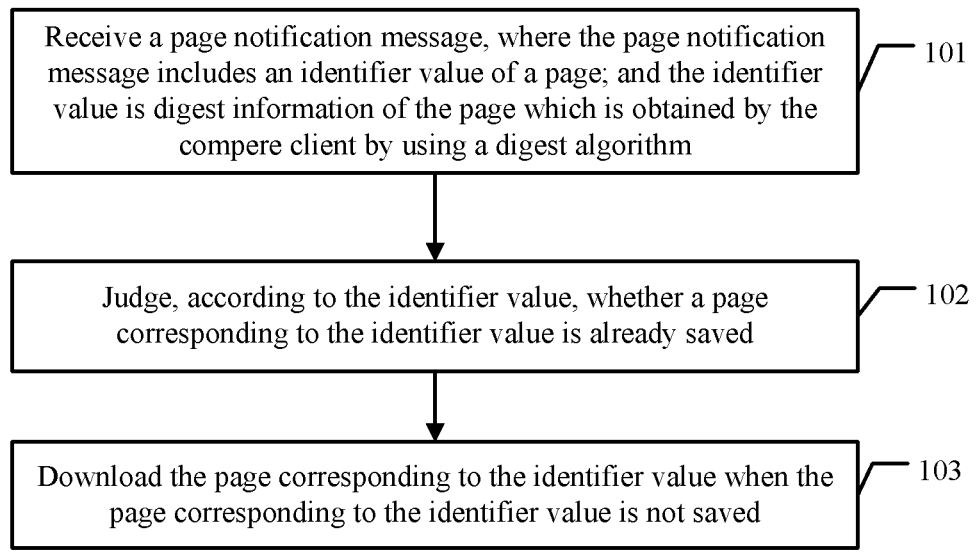
FIG. 1 is a schematic diagram of a document sharing method according to an embodiment of the present invention.

Referring to FIG. 1, an embodiment of a document sharing method in the embodiments of the present invention includes:

101. Receive a page notification message, where the page notification message includes an identifier value of a page; and the identifier value is digest information of the page obtained by a compere client by using a digest algorithm.

In the embodiment of the present invention, the compere client partitions, after sharing a document, the shared document into at least one page, and caches the at least one page. In addition, the compere client further obtains, by using a digest algorithm, digest information of each partitioned page, and uses the digest information as the identifier value of a corresponding page.

In the embodiment of the present invention, the compere client can partition the document into at least one page according to needs or in a manner preset in a system. For example, for a document in PowerPoint, Word, or another format, the compere client may partition the document into several pages in the unit of pages of the document, that is, if a document in Word format has five pages, the compere client may partition the document into five pages; or, the compere client may partition the document into pages according to a preset data size, for example, in the unit of 15 kbit.

In the embodiment of the present invention, the compere client sends a page notification message, where the notification message includes an identifier value of a page, so that the server can receive the page notification message. In addition, the server further sends, after receiving the page notification message, the page notification message to a participant client in a Web conference. Therefore, in the embodiment of the present invention, the server and the participant client receive the page notification message.

The identifier value of the page obtained by using the digest algorithm can be used to ensure that information transmission is complete and consistent, and the digest algorithm is a widely used algorithm in a computer, so that two pages with identical data have the same digest information, that is, the two pages have the same identifier value.

102. Judge, according to the identifier value, whether a page corresponding to the identifier value is already saved.

In the embodiment of the present invention, the server and the participant client judge whether the page corresponding to the identifier value in the page notification message is already saved.

In the embodiment of the present invention, the server and the participant client save pages of a shared document in a Web conference into a memory and further save a correspondence between the pages and the identifier values of the pages. Therefore, in the embodiment of the present invention, the server and the participant client can judge whether a page corresponding to the identifier value in the received page notification message is already saved.

103. Download the page corresponding to the identifier value when the page corresponding to the identifier value is not saved.

In the embodiment of the present invention, if the page corresponding to the identifier value in the page notification message received is not saved in the server or the participant client, the page corresponding to the identifier value is downloaded, so that the participant client can display the page corresponding to the identifier value.

It should be noted that, in the embodiment of the present invention, if the page corresponding to the identifier value is already saved, it indicates that the page does not need to be downloaded, which can effectively save bandwidth.

It should be noted that, in the embodiment of the present invention, the identifier value of the page obtained by using the digest algorithm may be any one of a message digest (Message Digest) MD2 value, an MD4 value, an MD5 value, a secure hash algorithm (SHA) value, and a RACE Integrity Primitives Evaluation Message Digest (RACE Integrity Primitives Evaluation Message Digest, RIPEMD) value, where the RACE stands for Rapid-Amplification of cDNA Ends.

In the embodiment of the present invention, the compere client partitions a shared document into at least one page, and uses digest information of the page obtained by using a digest algorithm as the identifier value, so that the server and the participant client can determine, according to the identifier value in the page notification message received, whether the page corresponding to the identifier value needs to be downloaded, which can effectively reduce bandwidth occupied by downloading a shared page, thereby saving the bandwidth.

Figure 2:
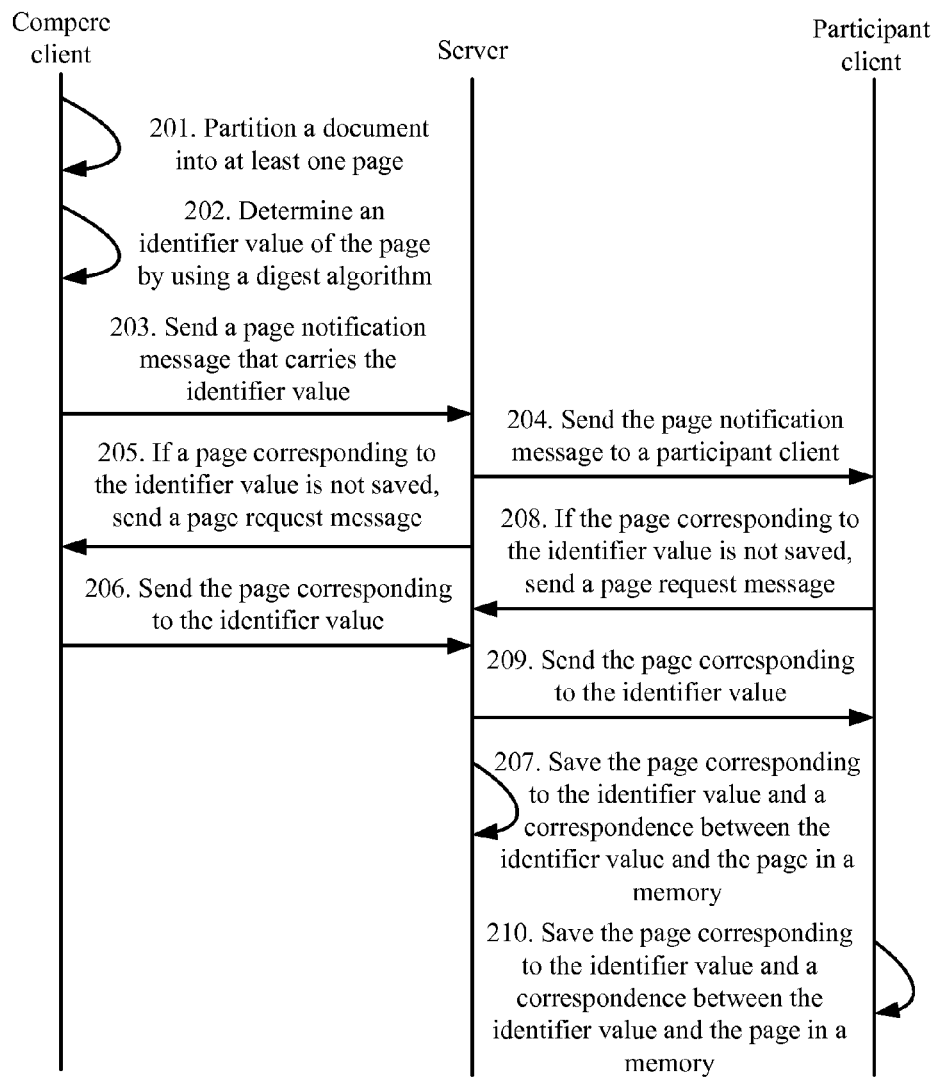
FIG. 2 is another schematic diagram of a document sharing method according to an embodiment of the present invention.

In the embodiment of the present invention, in the Web conference, the compere client uploads a page to the server, and the participant client downloads a page from the server. To make the document sharing method provided in the embodiments of the present invention more compressible, the following specifically describes an interaction between the compere client, the participant client, and the server. Referring to FIG. 2, an embodiment of a document sharing method in the embodiments of the present invention includes:

201. A compere client partitions a document into at least one page.

In the embodiment of the present invention, the compere client partitions the document into at least one page, where the document is the one shared in a conferencing system, and there are multiple partitioning manners. For example, for a document in PowerPoint or Word format, the compere client may partition the document into corresponding pages according to a page partitioning manner of the document, that is, if the document in Word format has five pages, the compere client partitions the document into five pages; or, the compere client may partition the document into pages according to a preset data size, for example, in the unit of 15 kbit.

202. The compere client determines an identifier value of the page by using a digest algorithm.

In the embodiment of the present invention, the compere client determines, after partitioning the shared document into pages, the identifier value of the page by using the digest algorithm, where the identifier value may be any one of an MD2 value, an MD4 value, an MD5 value, an SHA value, and an RIPEMD value.

203. The compere client sends a page notification message that carries the identifier value to a server.

In the embodiment of the present invention, the compere client sends, after determining the identifier value of the page, the page notification message that carries the identifier value to the server, so that the server can determine, according to the identifier value, whether the page corresponding to the identifier value needs to be downloaded from the compere client.

It should be noted that, in the prior art, after the compere client is closed, the shared document is lost. Therefore, in the embodiment of the present invention, to avoid loss the document on the compere client side, the compere client saves partitioned pages of the shared document in a memory and also saves a correspondence between the page and the identifier value of the page. To avoid repeated saving, the compere client judges, according to the identifier value of the page, whether the page corresponding to the identifier value is already saved; if the page corresponding to the identifier value is not saved in the memory of the compere client, the compere client saves the page corresponding to the identifier value and the correspondence between the identifier value and the page in the memory of the compere client. It should be noted that, in the embodiment of the present invention, if a storage space occupied by the page and the correspondence between the page and the identifier value of the page in the compere client reaches a preset value, the compere client deletes, according to a preset rule, the page of a preset size and the correspondence between the page and the identifier value of the page, where the preset rule may be a time rule, that is, the earliest page and the correspondence between the page and the identifier value of the page are deleted. In actual applications, the saved page and the correspondence between the page and the identifier value of the page may be deleted according to specific needs and settings, which is not limited herein.

204. The server sends the page notification message to a participation client, and the server continues to execute step 205, and the participation client executes step 208.

In the embodiment of the present invention, the server further sends the received page notification message to the participant client in a Web conference, so that the participant client can determine, according to the identifier value in the page notification message, whether the page corresponding to the identifier value needs to be downloaded from the server.

205. If the page corresponding to the identifier value is not saved in the server, the server sends a page request message to the compere client.

In the embodiment of the present invention, the server judges, after receiving the page notification message from the compere client, whether the page corresponding to the identifier value included in the page notification message is already saved; if the page corresponding to the identifier value is not saved in the server, the server sends the page request message to the compere client, where the page request message includes the identifier value of the page requested.

It should be noted that, in the embodiment of the present invention, if the server has already saved the page corresponding to the md5 value, the server does not need to send the page request message to the compere message to obtain the corresponding page, that is, the server does not need to download the page from the compere client, thereby saving bandwidth.

206. The compere client sends the page corresponding to the identifier value to the server.

In the embodiment of the present invention, after the server sends the page request message to the compere client, the compere client searches, according to the identifier value carried in the page request message, a saved correspondence between pages and identifier values in the memory to obtain the page corresponding to the identifier value, and sends the page corresponding to the identifier value to the server.

207. The server saves the page corresponding to the identifier value and the correspondence between the identifier value and the page in the memory of the server.

In the embodiment of the present invention, after obtaining the page corresponding to the identifier value by using the page request message, the server saves the page corresponding to the identifier value and the correspondence between the identifier value and the page in the memory of the server.

It should be noted that, in the embodiment of the present invention, the memory of the server may be a memory of the server or a memory connected to the server, which is not limited herein.

In the embodiment of the present invention, the correspondence between identifier values and pages is saved, so that after receiving the page notification message from the compere client, the server can search, according to the identifier value in the page notification message, the saved correspondence between identifier values and pages to judge whether the page corresponding to the identifier value in the page notification message is already saved; and further, when receiving the page request message from the participant client, the server can search, according to the identifier value in the page request message, the saved correspondence between identifier values and pages to determine the page to be fed back to the participant client.

208. If the page corresponding to the identifier value is not saved in the participant client, the participant client sends a page request message to the server.

In the embodiment of the present invention, the participant client receives the page notification message from the server, where the page notification message includes the identifier value of the page shared by the compere client; the participant client judges whether the page corresponding to the identifier value is already saved; if the page corresponding to the identifier value is not saved in the participant client, the participant client sends the page request message that includes the identifier value to the server.

It should be noted that, in the embodiment of the present invention, if the participant client already saves the page corresponding to the identifier value, the participant client does not need to download the page corresponding to the identifier value from the server, thereby saving bandwidth.

209. The server sends the page corresponding to the identifier value to the participant client.

In the embodiment of the present invention, the server receives the page request message that includes the identifier value, searches for the page corresponding to the identifier value, and feeds back the page corresponding to the identifier value to the participant client; and the participant client receives the page corresponding to the identifier value fed back by the server.

It should be noted that, in the embodiment of the present invention, if the server fails to find the page corresponding to the identifier value in the page request message, the server sends the page request message to the compere client; and after receiving the page corresponding to the identifier value fed back by the compere client, the server feeds back the page corresponding to the identifier value to the participant client. In addition, the server also saves the page corresponding to the identifier value and the correspondence between the page and the identifier value.

210. The participant client saves the page corresponding to the identifier value and the correspondence between the identifier value and the page in a memory of the participant client.

In the embodiment of the present invention, after receiving the page corresponding to the identifier value fed back by the server, the participant client saves the page corresponding to the identifier value and the correspondence between the identifier value and the page in the memory of the participant client.

In the embodiment of the present invention, the participant client saves the correspondence between identifier values and pages, so that the participant client can search, when the participant client receives the page notification message and according to the identifier value in the page notification message, the saved correspondence between identifier values and pages to judge whether the page corresponding to the identifier value in the page notification message is already saved.

It should be noted that, in the embodiment of the present invention, if a storage space occupied by the page and the correspondence between the page and the identifier value of the page saved in the server or the participant client reaches a preset value, the server or the participant client deletes, according to a preset rule, the page of a preset size and the correspondence between the page and the identifier value of the page, where the preset rule may be a time rule, that is, the earliest page and the correspondence between the page and the identifier value of the page are deleted. In actual applications, the saved page and the correspondence between the page and the identifier value of the page may be deleted according to specific needs and settings, which is not limited herein.

In the embodiment of the present invention, the compere client partitions a shared document into at least one page, calculates an identifier value of the page by using a digest algorithm, carries the identifier value of the page in a page notification message, and sends the page notification message to the server, so that the server can judge, according to the identifier value, whether a page corresponding to the identifier value is already saved; and if the page corresponding to the identifier value is not saved, the server downloads the page corresponding to the identifier value from the compere client, which can effectively reduce the number of pages downloaded by the server from the compere client, thereby saving bandwidth. In addition, the server sends the received page notification message to the participant client, so that the participant client downloads, when the page corresponding to the identifier value in the page notification message is not saved in the participant client, the page corresponding to the identifier value from the server, which can effectively reduce the number of pages downloaded by the participant client, thereby saving bandwidth.

Figure 3:
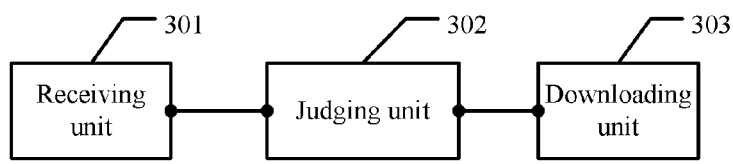
FIG. 3 is a schematic diagram of a device according to an embodiment of the present invention.

Referring to FIG. 3, an embodiment of a device in the embodiments of the present invention includes:

a receiving unit 301, configured to receive a page notification message, where the page notification message includes an identifier value of a page; the page is any one page of at least one page obtained by a compere client by partitioning a document; and the identifier value is digest information of the page obtained by the compere client by using a digest algorithm;

a judging unit 302, configured to judge, after the receiving unit receives the page notification message that includes the identifier value and according to the identifier value, whether the page corresponding to the identifier value is already saved; and a downloading unit 303, configured to download, after the judging unit determines that the page corresponding to the identifier value is not saved, the page corresponding to the identifier value.

In the embodiment of the present invention, the receiving unit 301 receives a page notification message that includes an identifier value of a page, where the page is any one page of at least one page obtained by partitioning a shared page and each page corresponds to an identifier value which is obtained by using a digest algorithm; then, the judging unit 302 judges whether the page corresponding to the identifier value is already saved; and if the judging unit 302 determines that the page corresponding to the identifier value is not saved, the downloading unit 303 downloads the corresponding page.

It should be noted that, in the embodiment of the present invention, the identifier value of the page obtained by using the digest algorithm may be any one of a message digest (Message Digest) MD2 value, an MD4 value, an MD5 value, a secure hash algorithm (Secure Hash Algorithm SHA) value, and a RACE integrity primitives evaluation message digest (RACE Integrity Primitives Evaluation Message Digest, RIPEMD) value, where the RACE stands for Rapid-Amplification of cDNA Ends.

In the embodiment of the present invention, a compere client partitions a document into at least one page, uses digest information of the page obtained by using a digest algorithm as the identifier value, and sends a page notification message that includes the identifier value to a device in a conferencing system; and the device determines, according to the identifier value in the page notification message, whether the page corresponding to the identifier value needs to be downloaded, which can effectively reduce bandwidth occupied by downloading the page, thereby saving the bandwidth.

Figure 4:
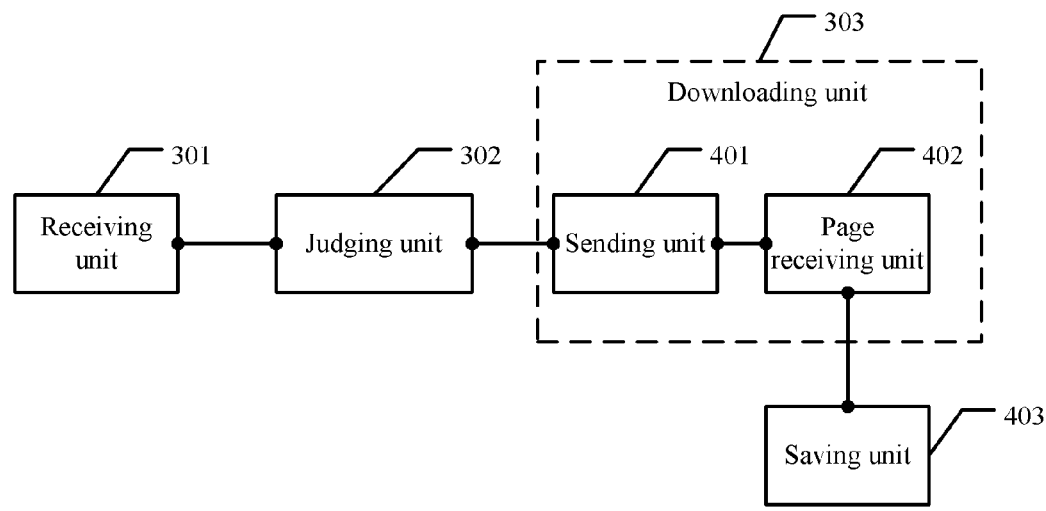
FIG. 4 is a schematic diagram of a server according to an embodiment of the present invention.

It should be noted that, in the embodiment of the present invention, the device may be a server or a participant client in a Web conference. The following specifically describes a structural diagram of the server when the device is a server. Referring to FIG. 4, an embodiment of the server in the embodiments of the present invention includes:

the receiving unit 301, the judging unit 302, and the downloading unit 302 according to the embodiment shown in FIG. 3, with content similar to those described in the embodiment shown in FIG. 3.

In the embodiment of the present invention, the receiving unit 301 is specifically configured to receive a page notification message from a compere client.

In the embodiment of the present invention, the downloading unit 303 includes:

a sending unit 401, configured to send, after the judging unit 302 determines that the page corresponding to the identifier value is not saved, a page request message to the compere client, where the page request message includes an identifier value; and a page receiving unit 402, configured to receive, after the sending unit 401 sends the page request message, the page corresponding to the identifier value sent by the compere client.

In the embodiment of the present invention, the server further includes:

a saving unit 403, configured to save, after the page receiving unit 402 receives the page corresponding to the identifier value, the page corresponding to the identifier value and a correspondence between the identifier value and the page in a memory of the server.

In the embodiment of the present invention, after the receiving unit 301 in the server receives a page notification message from the compere client, the judging unit 302 judges, according to an identifier value included in the page notification message, whether the page corresponding to the identifier value is already saved; if the page corresponding to the identifier value is not saved, the sending unit 401 in the downloading unit 303 sends a page request message to the compere client, where the page request message includes an identifier value; then, the page receiving unit 402 in the downloading unit 303 receives the page corresponding to the identifier value fed back by the compere client, and the saving unit 403 saves the page corresponding to the identifier value and a correspondence between the identifier value and the page in the memory of the server.

In the embodiment of the present invention, the server judges, according to an identifier value in the received page notification message, whether the page corresponding to the identifier value is already saved; if the page corresponding to the identifier value is not saved, the server requests the page corresponding to the identifier value by sending the page request message to the compere client; if the page corresponding to the identifier value is already saved, the page corresponding to the identifier value does not need to be downloaded, which can effectively reduce the number of pages downloaded by the server from the compere client, thereby saving bandwidth.

Figure 5:
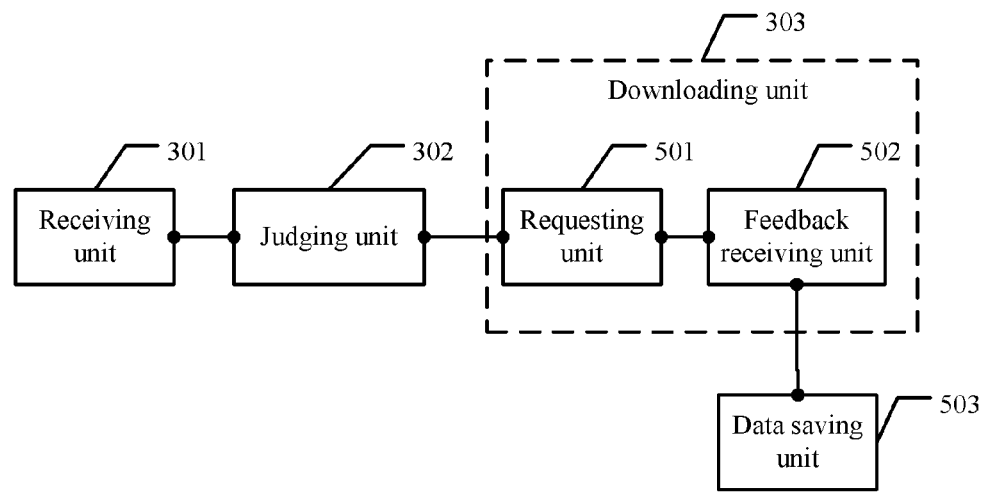
FIG. 5 is a schematic diagram of a participant client according to an embodiment of the present invention.

The following describes a structure of a participant client when the device is a participant client. Referring to FIG. 5, an embodiment of a participant client in the embodiments of the present invention includes:

the receiving unit 301, the judging unit 302, and the downloading unit 302 according to the embodiment shown in FIG. 3, with content similar to those described in the embodiment shown in FIG. 3.

The receiving unit 301 of the participant client is specifically configured to receive a page notification message from a server.

In the embodiment of the present invention, the downloading unit 303 includes:

a requesting unit 501, configured to send, after the judging unit 302 determines that the page corresponding to the identifier value is not saved, a page request message to the server, where the page request message includes the identifier value; and a feedback receiving unit 502, configured to receive the page corresponding to the identifier value fed back by the server.

In the embodiment of the present invention, the participant client further includes:

a data saving unit 503, configured to save, after the feedback receiving unit 502 receives the page corresponding to the identifier value, the page corresponding to the identifier value and a correspondence between the identifier value and the page in a memory of participant client.

In the embodiment of the present invention, after the receiving unit 301 of the participant client receives a page notification message from the server, the judging unit 302 judges, according to an identifier value included in the page notification message, whether the page corresponding to the identifier value is already saved; if the page corresponding to the identifier value is not saved, the requesting unit 501 in the downloading unit 303 sends a page request message to the server; and then the feedback receiving unit 502 receives the page corresponding to the identifier value fed back by the feedback receiving unit 502. Finally, the data saving unit 503 saves the page corresponding to the identifier value and the correspondence between the identifier value and the page in the memory of the participant client.

In the embodiment of the present invention, the participant client judges, according to the identifier value included in the page notification message sent by the server, whether the page corresponding to the identifier value is already saved; if the page corresponding to the identifier value is not saved, the participant client downloads the page corresponding to the identifier value from the server, which can effectively reduce the number of pages downloaded by the participant client from the server, thereby saving bandwidth.

Figure 6:
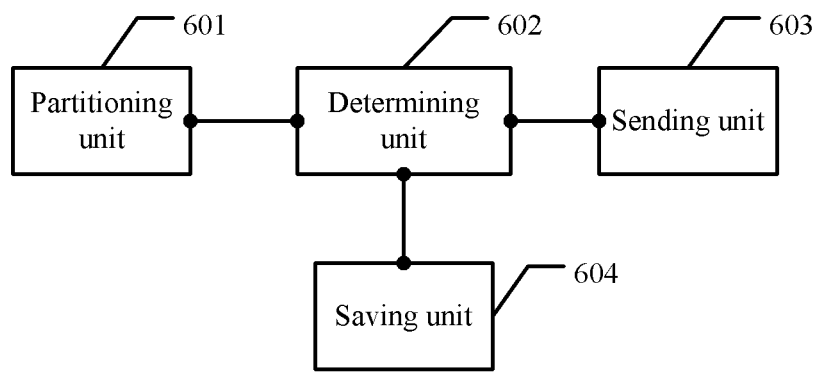
FIG. 6 is a schematic diagram of a compere client according to an embodiment of the present invention.

Referring to FIG. 6, an embodiment of a compere client in the embodiments of the present invention includes:

a partitioning unit 601, configured to partition a document into at least one page;

a determining unit 602, configured to determine, after the partitioning unit partitions the document into at least one page, an identifier value of the page by using a digest algorithm; and a sending unit 603, configured to carry, after the determining unit determines the identifier value of the page, the identifier value of the page in a page notification message, and send the page notification message to a server, so that the server determines, according to the identifier value, whether the page corresponding to the identifier value needs to be downloaded from the compere client, and the server sends the page notification message to a participant client.

The sending unit 603 is further configured to send the page corresponding to the identifier value to the server if a page request message that includes the identifier value is received from the server.

The compere client further includes:

a saving unit 604, configured to save, if the page corresponding to the identifier value is not saved in a memory of the compere client, the page corresponding to the identifier value and a correspondence between the identifier value and the page in the memory.

In the embodiment of the present invention, the partitioning unit 601 of the compere client partitions a shared document into at least one page; then, the determining unit 602 determines the identifier value of the partitioned page; further, the sending unit 603 carries the identifier value of the page in the page notification message, and sends the page notification message to the server, so that the server determines, according to the identifier value, whether the page corresponding to the identifier value needs to be downloaded from the compere client, and the server sends the page notification message to the participant client. In addition, if the page corresponding to the identifier value is not saved in the memory of the compere client, the saving unit 604 saves the page corresponding to the identifier value and the correspondence between the identifier value and the page in the memory.

In the embodiment of the present invention, if the compere client receives the page request message that includes the identifier value from the server, the sending unit 603 sends the page corresponding to the identifier value to the server.

In the embodiment of the present invention, the compere client partitions a shared document into pages, obtains identifier values of the pages by using a digest algorithm, and sends the identifier values of the pages to the server; and the server sends the identifier values of the pages to the participant client, so that the server and the participant client can judge, according to the received identifier values, whether a page needs to be downloaded, which effectively reduces the number of pages downloaded by the server and the participant client, thereby saving bandwidth.

It should be noted that, the identifier value in the embodiments shown in FIG. 4 to FIG. 6 may be any one of an MD2 value, an MD4 value, an MD5 value, an SHA value, and a RIPEMD value.

Figure 7:
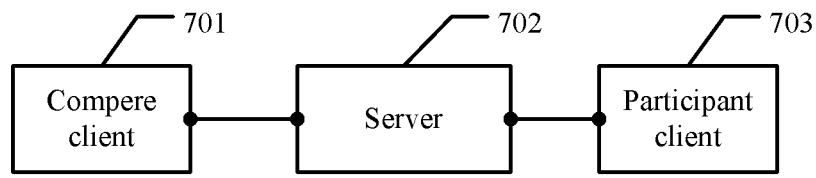
FIG. 7 is a schematic diagram of a document sharing system according to an embodiment of the present invention.

Referring to FIG. 7, an embodiment of a document sharing system in the embodiments of the present invention includes:

the server 701 according to the embodiment shown in FIG. 4, the participant client 702 according to the embodiment shown in FIG. 5, and the compere client 703 according to the embodiment shown in FIG. 6.

The compere client partitions a shared document into at least one page, uses digest information of the page obtained by using a digest algorithm as an identifier value, and sends a page notification message that includes the identifier value of the page to the server 701; the server 701 can sends the received page notification message to the participant client 702, and the participant client 702 can determine, according to the identifier value, whether the page corresponding to the identifier value needs to be downloaded from the server 701; and the server 701 can determine, according to the identifier value, whether the page corresponding to the identifier value needs to be downloaded from the compere client 703; and if the server 701 determines, according to the identifier value, that the page corresponding to the identifier value is already saved, the page corresponding to the identifier value does not need to be downloaded, which can effectively save bandwidth.

A person of ordinary skill in the art may understand that all or a part of the steps of the methods in the embodiments may be implemented by a program instructing relevant hardware. The program may be stored in a computer readable storage medium. The storage medium may include: a read-only memory, a magnetic disk, or an optical disc.

A document sharing method, system, and device provided by the present invention has been described in detail. Those skilled in the art can make modifications to the specific implementation manner and application scope according to the idea in the embodiments of the present invention. Therefore, content of this specification should not be considered a limitation on the present invention.

What is claimed is:

1. A document sharing method in a Web conference, wherein a document is partitioned into at least one page on a compere client, and the method comprises:
   receiving, by a server and a participant client in the Web conference, a page notification message, wherein the page notification message comprises an identifier value of a page, and the identifier value is digest information of the page obtained by the compere client by using a digest algorithm;
   judging, by the server and the participant client and according to the identifier value, whether the page corresponding to the identifier value is already saved; and
   downloading, by the server and the participant client, the page corresponding to the identifier value when the page corresponding to the identifier value is not saved.

2. The method according to claim 1, wherein the receiving a page notification message comprises:
   receiving, by the server, the page notification message from the compere client; and
   the downloading the page corresponding to the identifier value comprises:
   sending, by the server, a page request message to the compere client, wherein the page request message comprises the identifier value; and
   receiving the page corresponding to the identifier value fed back by the compere client.

3. The method according to claim 2, wherein after the receiving the page corresponding to the identifier value fed back by the compere client, the method further comprises:
   saving, by the server, the page corresponding to the identifier value and a correspondence between the identifier value and the page in a memory of the server.

4. The method according to claim 1, wherein the receiving a page notification message comprises:
   receiving, by the participant client, the page notification message from a server; and
   the downloading the page corresponding to the identifier value comprises:
   sending, by the participant client, a page request message to the server, wherein the page request message comprises the identifier value; and
   receiving the page corresponding to the identifier value fed back by the server.

5. The method according to claim 4, wherein the receiving the page corresponding to the identifier value fed back by the server comprises:
   saving, by the participant client, the page corresponding to the identifier value and a correspondence between the identifier value and the page in a memory of the participant client.

6. The method according to claim 1, wherein the identifier value is any one of a message digest MD2 value, an MD4 value, an MD5 value, a secure hash algorithm SHA value, and a RACE integrity primitives evaluation message digest RIPEMD value.

7. A document sharing method in a Web conference, comprising:
   partitioning, by a compere client in the Web conference, a document into at least one page;
   determining, by the compere client, an identifier value of the page by using a digest algorithm; and
   sending, by the compere client, a page notification message, which carries the identifier value of the page, to a server, so that the server determines, according to the identifier value, whether the page corresponding to the identifier value needs to be downloaded from the compere client, and the server sends the page notification message to a participant client.

8. The method according to claim 7, further comprising:
   saving, if the page corresponding to the identifier value is not saved in a memory of the compere client, the page corresponding to the identifier value and a correspondence between the identifier value and the page in the memory.

9. The method according to claim 7, further comprising:
   sending, if a page request message that comprises the identifier value is received from the server, the page corresponding to the identifier value to the server.

10. The method according to claim 7, wherein the identifier value is any one of a message digest MD2 value, an MD4 value, an MD5 value, a secure hash algorithm SHA value, and a RACE integrity primitives evaluation message digest RIPEMD value.

11. A device, comprising:
a receiving unit, configured to receive a page notification message, wherein the page notification message comprises an identifier value of a page; the page is any one page of at least one page obtained by a compere client by partitioning a document; and the identifier value is digest information of the page obtained by the compere client by using a digest algorithm;
a judging unit, configured to judge, after the receiving unit receives the page notification message that comprises the identifier value and according to the identifier value, whether the page corresponding to the identifier value is already saved; and
a downloading unit, configured to download, after the judging unit determines that the page corresponding to the identifier value is not saved, the page corresponding to the identifier value.

12. The device according to claim 11, wherein the device is a server;
the receiving unit is specifically configured to receive the page notification message from the compere client; and
the downloading unit comprises:
a sending unit, configured to send, after the judging unit determines that the page corresponding to the identifier value is not saved, a page request message to the compere client, wherein the page request message comprises the identifier value; and
a page receiving unit, configured to receive, after the sending unit sends the page request message, the page corresponding to the identifier value fed back by the compere client.

13. The device according to claim 12, wherein the server further comprises:
a saving unit, configured to save, after the page receiving unit receives the page corresponding to the identifier value, the page corresponding to the identifier value and a correspondence between the identifier value and the page in a memory of the server.

14. The device according to claim 11, wherein the device is a participant client; wherein
the receiving unit is specifically configured to receive the page notification message from a server; and
the downloading unit comprises:
a requesting unit, configured to send, after the judging unit determines that the page corresponding to the identifier value is not saved, a page request message to the server, wherein the page request message comprises the identifier value; and
a feedback receiving unit, configured to receive the page corresponding to the identifier value fed back by the server.

15. The device according to claim 14, wherein the participant client further comprises:
a data saving unit, configured to, after the feedback receiving unit receives the page corresponding to the identifier value, save the page corresponding to the identifier value and a correspondence between the identifier value and the page in a memory of the participant client.

16. A compere client in a Web conference, comprising:
a memory storing at least one program; and
computer hardware in communication with the memory and executing the at least one program to configure the compere client to:
partition a document into at least one page;
determine, after the partitioning unit finishes the page partitioning, an identifier value of the page by using a digest algorithm; and
after the determining the identifier value of the page, carry the identifier value of the page in a page notification message, and send the page notification message to a server, so that the server determines, according to the identifier value, whether the page corresponding to the identifier value needs to be downloaded from the compere client, and the server sends the page notification message to a participant client.

17. The compere client according to claim 16, wherein the compere client is further configured to send the page corresponding to the identifier value to the server if a page request message that comprises the identifier value is received from the server; and
save, if the page corresponding to the identifier value is not saved in a memory of the compere client, the page corresponding to the identifier value and a correspondence between the identifier value and the page in the memory of the compere client.

18. A document sharing system for a Web conference, comprising:
a server;
a participant client in the Web conference and in communication with the server; and
a compere client in communication with the server and configured to partition a document into at least one page, to determine an identifier value of the page by using a digest algorithm, and to carry the identifier value of the page in a page notification message, and send the page notification message to the server, so that the server determines, according to the identifier value, whether the page corresponding to the identifier value needs to be downloaded from the compere client, and the server sends the page notification message to the participant client.

* * * * *